United States Patent [19]

Jang et al.

[11] Patent Number: 5,268,967
[45] Date of Patent: Dec. 7, 1993

[54] METHOD FOR AUTOMATIC FOREGROUND AND BACKGROUND DETECTION IN DIGITAL RADIOGRAPHIC IMAGES

[75] Inventors: Ben K. Jang, Rochester, N.Y.; Ralph Schaetzing, Erlangen, Fed. Rep. of Germany

[73] Assignee: Eastman Kodak Company, Rochester, N.Y.

[21] Appl. No.: 906,191

[22] Filed: Jun. 29, 1992

[51] Int. Cl.$^5$ .................. G06K 9/34; G06F 15/42
[52] U.S. Cl. .................. 382/6; 364/413.13; 382/9; 382/22
[58] Field of Search .......... 382/6, 9, 22, 37, 38, 382/50, 54; 358/433; 364/413.13

[56] References Cited

U.S. PATENT DOCUMENTS

| | | | |
|---|---|---|---|
| 4,731,863 | 3/1988 | Sezan et al. | 382/51 |
| 4,804,842 | 2/1989 | Nakajima | 250/327.2 |
| 4,829,181 | 5/1989 | Shimura | 250/327.2 |
| 4,851,678 | 7/1989 | Adachi et al. | 250/327.2 |
| 4,859,850 | 8/1989 | Funahashi et al. | 250/327.2 |
| 4,952,805 | 8/1990 | Tanaka | 250/327.2 |
| 4,962,539 | 10/1990 | Takeo et al. | 382/9 |
| 4,967,079 | 10/1990 | Shimura | 250/327.2 |
| 5,028,782 | 7/1991 | Nakajima | 250/327.2 |
| 5,040,225 | 8/1991 | Gouge | 382/6 |
| 5,050,222 | 9/1991 | Lee | 382/38 |
| 5,093,869 | 3/1992 | Alves et al. | 382/37 |
| 5,101,280 | 3/1992 | Moronaga et al. | 358/433 |
| 5,150,433 | 9/1992 | Daly | 358/433 |
| 5,164,993 | 11/1992 | Capozzi et al. | 382/51 |

FOREIGN PATENT DOCUMENTS 288042 10/1988 European Pat. Off. .

OTHER PUBLICATIONS

IEEE Transaction on Medical Imaging, vol. 8, No. 2, p. 154, Jun. 1989.
IEEE Transactions on Pattern Analysis and Machine Intelligence, Haralick et al., vol. 9, p. 532, 1987.
Digital Picture Processing, Rosenfeld and Kak, 2nd Ed., vol. 2, 1982.
Syntactic Methods in Pattern Recognition, Academic Press, New York, 1974.

*Primary Examiner*—Leo H. Boudreau
*Assistant Examiner*—Larry J. Prikockis
*Attorney, Agent, or Firm*—William F. Noval

[57] ABSTRACT

A digital image processing method automatically separates (segments) the desired regions in a digital radiographic image (i.e., the body part being imaged) from the undesired regions (background areas around the body part that have received unattenuated radiation or foreground areas that have received very little radiation due to the use of radiation limiting devices). The method includes the steps of edge detection, block generation, block classification, block refinement and bit map generation.

15 Claims, 15 Drawing Sheets

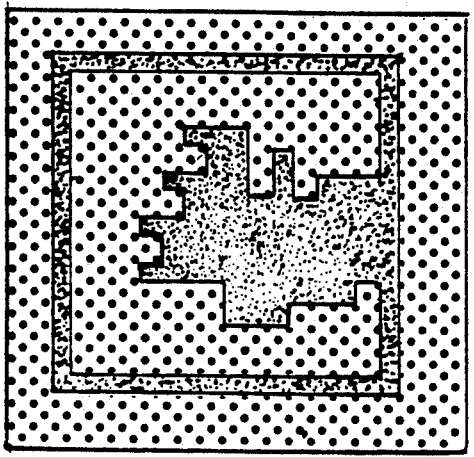
FIG. 5e OBJECT/NONOBJECT BINARY BLOCK MAP
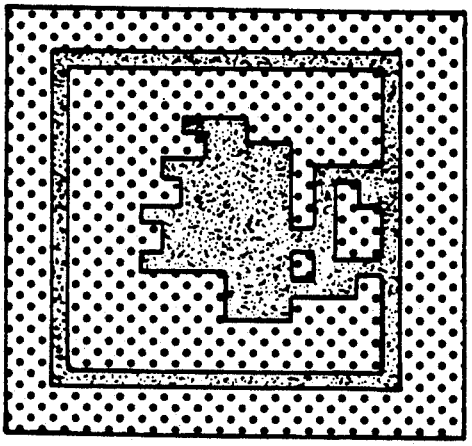
FIG. 5d HOMOGENEOUS/NONHOMOGENEOUS BINARY BLOCK MAP
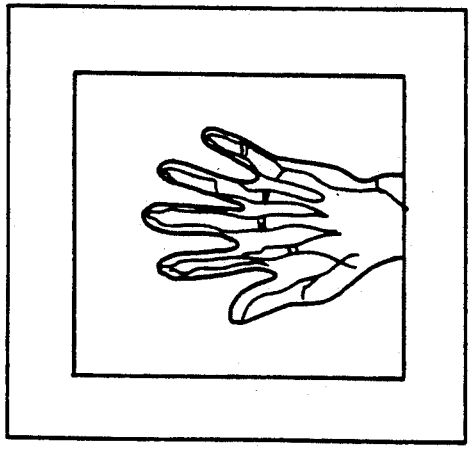
FIG. 5c EDGE STRENGTH MAP

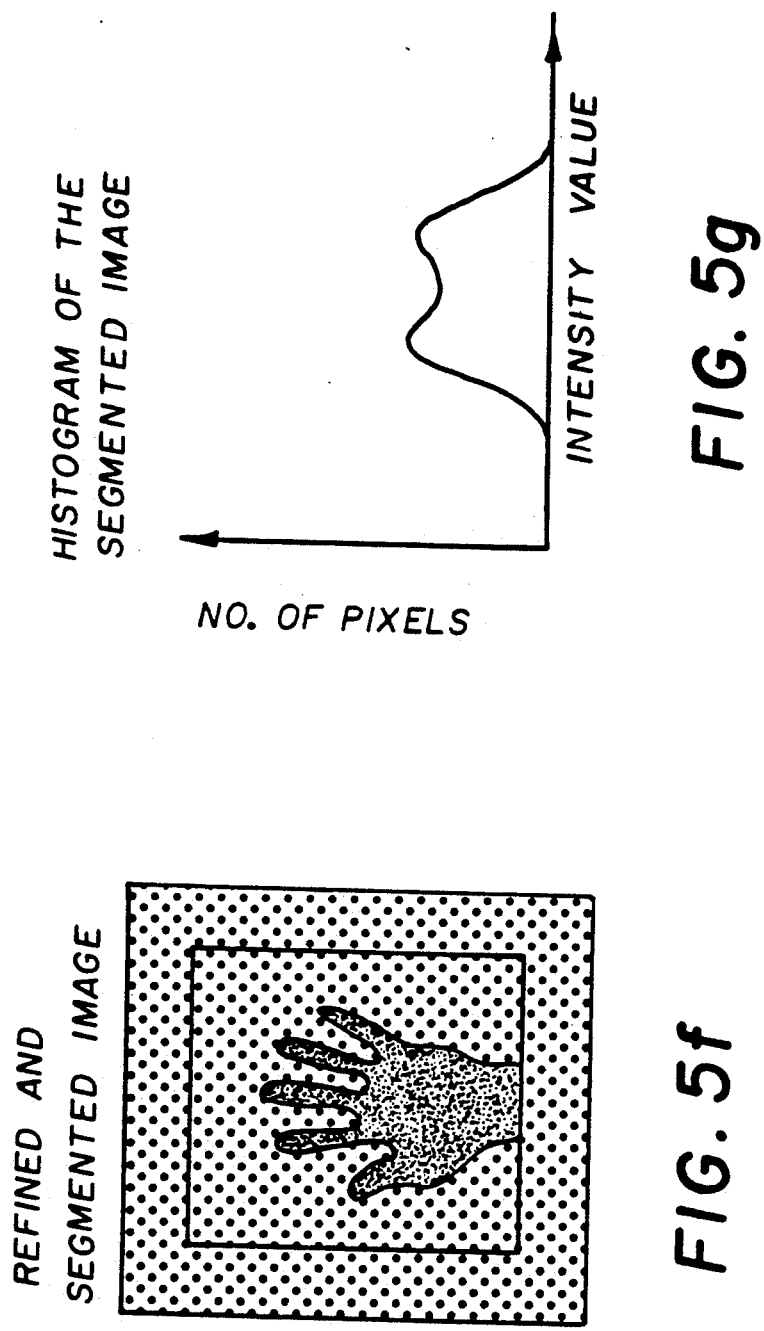

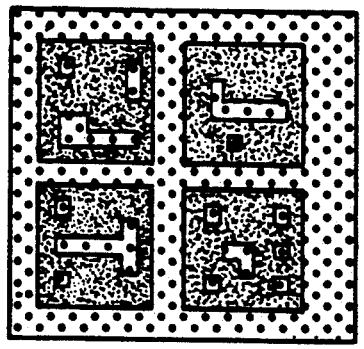
FIG. 7c HOMOGENEOUS/NONHOMOGENEOUS BINARY BLOCK MAP
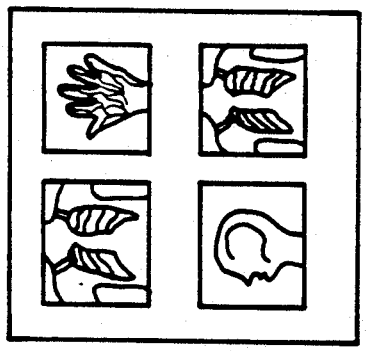
FIG. 7b EDGE STRENGTH MAP
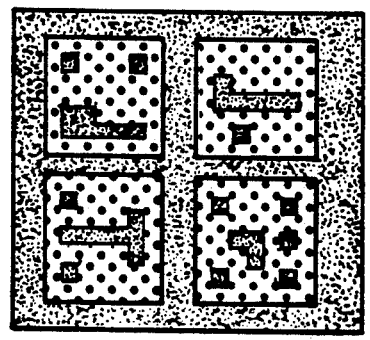
FIG. 7d COMPLEMENT OF FIG. 7C
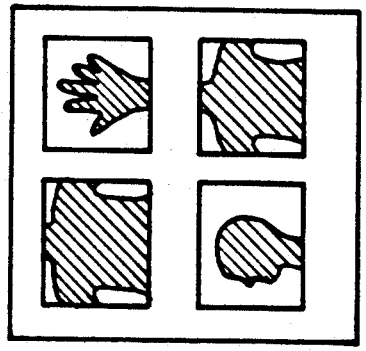
FIG. 7a INPUT IMAGE

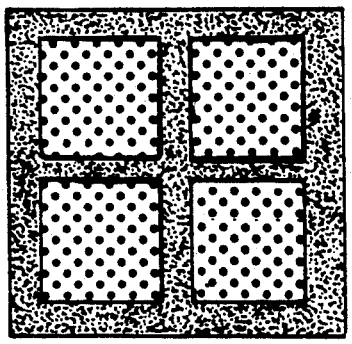
FIG. 7L CONVERGED RESULT
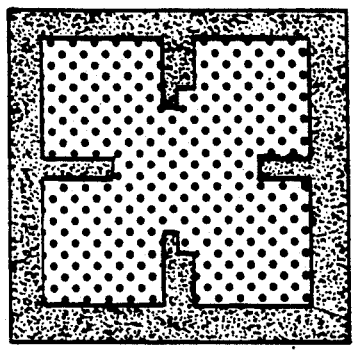
FIG. 7k REG. GR. 15 IT.
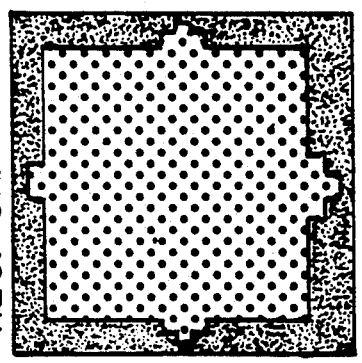
FIG. 7j REG. GR. 10 IT.
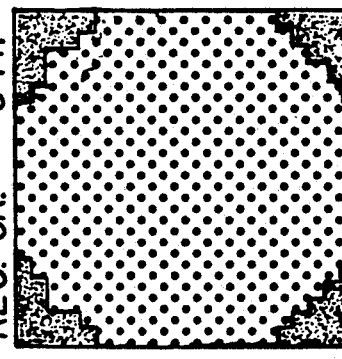
FIG. 7i REG. GR. 5 IT.
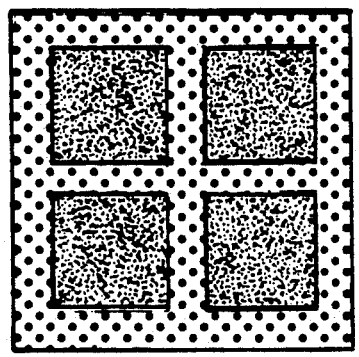
FIG. 7m COMPLEMENT OF FIG. 7L

METHOD FOR AUTOMATIC FOREGROUND AND BACKGROUND DETECTION IN DIGITAL RADIOGRAPHIC IMAGES

TECHNICAL FIELD OF THE INVENTION

The present invention relates in general to digital image processing, and, more particularly, to a method for automatically separating (segmenting) the desired regions in a digital radiographic image (i.e., the body part being imaged) from the undesired regions (areas around the body part that have received unattenuated radiation or have received very little radiation due to the use of beam limiting devices).

BACKGROUND OF THE INVENTION

In medical imaging, accurate diagnosis of disease often depends on the detection of small, low-contrast details within the image. The probability of detection of these details, in turn, depends critically on their visibility in the image. A number of factors, including the body part being imaged, the exposure geometry and technique, and the characteristics of the detector can affect this visibility. In traditional screen/film radiography, for example, the characteristic curve of the screen/film system largely determines the contrast with which details are displayed in the final image. In digital radiography, on the other hand, the separation of image acquisition and display stages allows an image or portion of an image to be displayed at an arbitrary output contrast depending on the particular need. This is done by creating a look-up table (LUT) that maps the digital values of the acquired image into a new set of digital values that will be sent to the display device and written on some output medium (e.g., on film or on a CRT). In addition, other kinds of image processing are often used to try to enhance even more the visibility of various structures in medical images. For example, edge enhancement techniques can be used to increase the visual contrast of edges, and therefore the conspicuity of certain kinds of structures in an image.

The effectiveness of such image processing techniques depends on the careful choice of the various parameters that control their performance. Furthermore, the variety of exam types and diagnostic needs encountered in medical imaging generally requires that such parameters be chosen based on the image to be processed, rather than based on some set of fixed characteristics applicable to every image. For example, histogram-based tone-scale transformation is a simple and effective way of adjusting the contrast of an image. However, the histogram is a global characteristic of the image, and therefore does not distinguish between the desired or important regions of the image (e.g., the body part or portion being imaged) and the undesired or unimportant regions of the image (e.g., regions of direct x-ray background or areas of very low exposure behind collimator blades used to restrict the size of the irradiation field). Thus, a tone-scale transformation based on such a histogram will be suboptimum if it is unduly influenced by the unimportant regions of the image.

Even in image processing techniques that are locally adaptive within the image, i.e., that depend on the local context of the image, such unimportant regions can create unwanted effects. For example, in adaptive edge enhancement, some parameters of the algorithm often depend on the global histogram or on a local histogram (Sezan et al., IEEE Trans. Med. Imaging, vol. 8, p. 154, 1989). If this histogram contains data from the undesired regions of the image, the algorithm parameters will be negatively influenced and a suboptimum edge enhancement performance can be expected.

Thus, it is desirable to provide a method to detect and distinguish the undesired and desired regions of a digital radiograph. Such a method would allow the parameters for various image processing techniques to be calculated more easily. In addition, the values of these parameters would be close to the optimum values, leading to improved quality and better depiction of the information needed for an accurate diagnosis.

A variety of methods have been proposed to detect undesired regions in images. In the descriptions that follow, the word "background" will be used to denote the direct x-ray background, that is, the region around the body part being imaged that has received unattenuated x-rays. The word "foreground" will be used to denote highly (x-ray) absorbing structures, like collimator blades, used to define the size and shape of the irradiation field. Thus, a digital radiograph consists of three regions: the body part being imaged (the object), the background, and the foreground.

Histogram-based methods for detecting foreground and/or background usually depend on the detection and recognition of peaks in the histogram (see Sezan et al., IEEE Trans. Med. Imaging, vol. 8, p. 154, 1989). For example, U.S. Pat. No. 4,731,863, issued Mar. 15, 1988, inventors Sezan et al., teaches a technique for finding gray level thresholds between anatomical structures and image regions based on zero-crossings of a peak detection function derived from application of smoothing and differencing operators to the image histogram. This method produces a series of peaks by analyzing the histogram at several different signal resolutions. One problem with this method is that the peaks need to be interpreted for each exam type and exposure technique. That is, a low-signal peak could correspond to foreground, but it could also correspond to a body portion if no foreground is present in the image. Correspondingly, a high-signal peak may be the image background, or it may be a high-signal body portion. Thus, some additional information may be needed to make the method robust.

Other methods of histogram analysis have also been proposed. U.S. Pat. No. 4,952,805, issued Aug. 28, 1990, inventor Tanaka, teaches a foreground finding technique based on dividing the histogram into several sections with an intensity thresholding procedure and then doing a statistical shape analysis (discriminate analysis) of the section believed to correspond to foreground. A decision about the presence and extent of a foreground region is made based on the shape of this section of the histogram. However, as above, the large variety of histogram shapes that can occur with different exam types and different input modalities (such as magnetic resononance imaging (MRI), computed tomography (CT), ultrasound (US), nuclear medicine, digital subtraction angiography (DSA), computed radiography (CR)) make this type-of analysis subject to error. In addition, since a single threshold is chosen to represent the transition from foreground to object, this method does not perform well when the transition is fairly wide, such as when x-ray scatter is present.

European Patent Application 288,042, published Oct. 26, 1988, inventors Tanaka et al., proposes a foreground and background finding method using the image histogram. In this method, the histogram is again divided into a number of sections by an automatic thresholding procedure. Then a statistical analysis (discriminate analysis), combined with information about the exam type, exposure technique, and desired body portion to be displayed, is used to adjust the separation points between the sections until desired ranges for the foreground, object, and background regions are found. This method is less prone to variations in exam type and input modality because this information is incorporated into the decision process. However, the use of fixed thresholds still poses problems if there is nonuniformity in either the foreground or background.

Generally, histogram-based methods work best when the peaks in the histogram corresponding to foreground and background are far enough away from the peak(s) corresponding to the body part of interest that they can be identified as separate. If the peaks overlap, which can occur if the background or foreground are nonuniform across the image, or if scatter behind the collimators causes the signal level in that area to come close to the highly x-ray absorbing structures in the body, then it becomes more difficult to separate foreground/background regions in the histogram with a single threshold.

A more effective way of detecting foreground and background is to include spatial information about the image in the analysis, in addition to the intensity information provided by the histogram. Several methods have been described for doing this. U.S. Pat. No. 4,804,842, issued Feb. 14, 1989 inventor Nakajima, and U.S. Pat. No. 5,028,782, issued Jul. 2, 1991 inventor Nakajima, for example, disclose a method for detecting foreground in an image based on calculating derivatives of the input image and then identifying edge points as those points where the value of the derivative is higher than a threshold value. Then a new histogram of the input image is done using only the points identified as edge points, and from this histogram a threshold value is chosen to represent the boundary of the foreground (i.e., the irradiation field). This method is claimed to provide a more accurate measure of the field than a simple histogram method. However, it still requires an a priori knowledge that a collimator or field stop was in fact used to define the irradiation field, otherwise low-signal portions of the image inside the body part may be clipped by the intensity thresholding that defines the boundary. Furthermore, if image pixels inside the body part have a signal value comparable to or lower than those underneath the collimator region (as when there is significant x-ray scatter), the edge of the irradiation field may not even be found with this method. Finally, if the region under the collimator is nonuniform in intensity, which is frequently the case when there is scatter present, there will not be a strong edge at the boundary of the irradiation field, and the derivative at the edge points may not have a high enough value to pass the threshold, leading to inaccuracies in finding the edge.

Other foreground detection methods have been described that use one dimensional edge detection along arbitrary lines drawn across the image. For example, U.S. Pat. No. 4,967,079, issued Oct. 30, 1990, inventor Shimura, discloses a method for storage phosphor digital radiography systems that uses derivatives along radial lines from the image center, followed by a thresholding operation to detect potential edge points of the irradiation field. The boundary of the field is recognized by testing the colinearity of the found edge points. In order to be effective, this method requires a strong edge transition from object to foreground or from background to foreground. While the latter is generally true, the object to foreground transition can sometimes be very weak and even inverted (body part with a lower signal than foreground, due to scatter). Furthermore, if the image involves multiple smaller images recorded on a large detector (so-called subdivision or multiple exposure recording), there will be many edges detected along radial lines from the image center, possibly leading to the detection of false boundaries.

An alternate approach to foreground detection has been disclosed in U.S. Pat. No. 4,859,850, issued Aug. 22, 1989, inventor Funahashi. In this case, lines are extended from the edge of the image towards the center and, for each line, the transition regions from low signal to high signal at the edge of an irradiation field are fit with a linear or nonlinear equation. When the differences between the extrapolated fitted values (calculated from the equation) and the actual image values inside the field become too large, or when the extrapolated values reach a threshold signal level, the edge of the field is assumed to have been found. One problem with this method is that it assumes that collimation has been used (i.e., a priori knowledge of the exposure technique is required). A second problem has already been mentioned above, namely, that the method assumes that the signal values inside the irradiation field are always larger than those immediately outside it, which is not always the case when scatter is present. A third problem is that if subdivision recording has been used, the method may not find all of the necessary edges to define each irradiation field within the image. Finally, the use of multiple linear or nonlinear fits on multiple lines across the image is an inefficient, time-consuming way to find the field boundaries.

A possible solution to the previously mentioned problem of detecting edges in subdivision recording has been proposed in U.S. Pat. No. 4,851,678, issued Jul. 25, 1989, inventors Adachi et al. In this method, designed for storage phosphor digital radiography, potential edge points can still be found using the above method of differentiation along lines, but other possibilities are also disclosed. For example, once a few candidate edge points have been found, a boundary tracking procedure, based on following the likeliest edge points around the boundary from nearest neighbor to nearest neighbor (using a ridge-following algorithm) until they close on themselves again, is used to find the irradiation field. This method claims to handle multiple exposure fields as well since multiple starting edge points can each be followed around their respective irradiation fields. A third method using statistical template matching with a series of stored, commonly used subdivision patterns is also disclosed. Since the method of finding prospective edge points is similar to those above, similar potential problems exist, namely, that the method can break down when the edge transition from object to foreground is weak or inverted. Also the ridge-following algorithm can be very sensitive to noise, so the image data must be smoothed before the analysis.

As indicated above, the presence of multiple smaller images recorded on a single larger recording medium (i.e., subdivision recording) can create problems in locating all of the foreground in the image. Sometimes a preprocessing stage can be used to identify the use of subdivision recording and also the format of the image (2-on-1, 4-on-1, etc.). For example, U.S. Pat. No.

4,829,181, issued May 9, 1989, inventor Shimura, teaches a method of recognizing a subdivision pattern in a storage phosphor system using differentiation to detect prospective edge points, followed by a colinearity test to see if the edge points lie on straight lines. If the edge points lie on straight lines, subdivision recording is judged to be present. A limitation of this method is that it can detect only rectilinear patterns, i.e., patterns with essentially horizontal or vertical linear separations.

Another approach to detecting such subdivision patterns is the use of pattern matching. U.S. Pat. No. 4,962,539, issued Oct. 9, 1990, inventor Takeo et al., discloses a method that uses a set of binary, stored masks representing typical subdivision recording patterns. The input digital image is converted into a binary image by thresholding, and the resulting binary image is statistically compared With each of the masks in the stored set. The stored mask with the highest degree of matching is judged to be the recording pattern on the input image. While this method can handle a wider variety of patterns than the one above, it is still limited to the stored library of patterns for matching. Any irregular patterns not included in the library may not have a high degree of matching, and may therefore be chosen incorrectly. Furthermore, the statistical matching can be complex and time consuming.

SUMMARY OF THE INVENTION

According to the present invention, there is provided an automatic digital image processing method for detecting and distinguishing in digital radiographic images both the regions of direct x-ray exposure around the body part being imaged ("background") and the regions in which beam-limiting devices have been used to restrict the size of irradiation field ("foreground"). Thus, their adverse effects on data derived or calculated from said digital radiographic image can be eliminated, and the parameters of the image processing algorithms used to further process said image can be calculated easily and can be set to their optimum values, leading to improved diagnostic utility and high image quality.

For any digital radiographic input image, the foreground and background detection method according to an aspect of the present invention consists of five steps: edge detection, block generation, block classification, block refinement, and bit map generation. According to the first step of the method, the edge content of the image is analyzed. The local edge content is one indicator of the level of detail or "busyness" in various parts of the image, and, therefore, an indicator of whether these parts are more likely to belong to the foreground/background region or to the object. After the edge detection step, in the second step the image is broken into a set of nonoverlapping, contiguous blocks of pixels. Further analysis of the image and the classification into foreground, background, and object take place on a block-by-block basis.

The third method step is block classification. There are ten possible states each block can have, depending on whether the block is basically homogeneous (relatively low edge density) or nonhomogeneous (relatively high edge density), and on what it contains (foreground pixels, background pixels, object pixels, mixtures of foreground pixels with background pixels, or mixtures of foreground and/or background pixels with object pixels). The information about edge content along with similar information from neighboring blocks is fed into a syntactic reasoning section that uses a set of clinically and empirically determined decision rules to classify each block of the image into one of two categories: foreground/background or object. For blocks that are around the periphery of the object (i.e., mixtures of object pixels with foreground and/or background pixels), the next step of the method, a refinement step, evaluates the fine structure inside each block and reclassifies portions of the block into the above-mentioned two categories. This ensures that the edge pixels of the body part being imaged are not disclassified.

In the last step of the method, the block classification arrived at in the previous step is then used to create a two-valued (binary) image that functions as a template for any further image processing to be done on the image. For example, if a histogram of the image is required, only those pixels with the correct value in the binary image are included in the calculation. If edge enhancement is being performed, pixels in the foreground/background blocks are not included in the calculation of enhancement parameters. In this way, only the relevant information in the image is included in subsequent image processing of the image, leading to images with high quality and high diagnostic utility.

Another object of the present invention is to detect a plurality of irradiation subregions on a single image. The detection method consists of five steps: edge detection, block generation, block classification, region growing, and bit map generation. The first two stages are the same as those of the aforementioned foreground/background detection method. However, in the block classification step, a block is simply categorized into two states, depending on whether the block is homogeneous (relatively low edge density) or nonhomogeneous (relatively high edge density). A region-growing process, starting from the homogeneous corner blocks of the image, is then used to detect the plurality of irradiation subregions. Finally, a two-valued (binary) image is generated to function as a template such that the aforementioned foreground/background detection method can be applied to each irradiation subregion.

BRIEF DESCRIPTION OF THE DRAWINGS

FIG. 2b is the histogram of the image in FIG. 2a.

FIG. 3b shows the histogram of the image in FIG. 3a.

FIGS. 5a-g show the steps of the method of the present invention applied to the hand image of FIG. 3A.

FIGS. 7a-m show another mode of the present invention, the detection of a plurality of irradiation subregions on a single image.

DESCRIPTION OF THE PREFERRED EMBODIMENTS

Figure 1A:
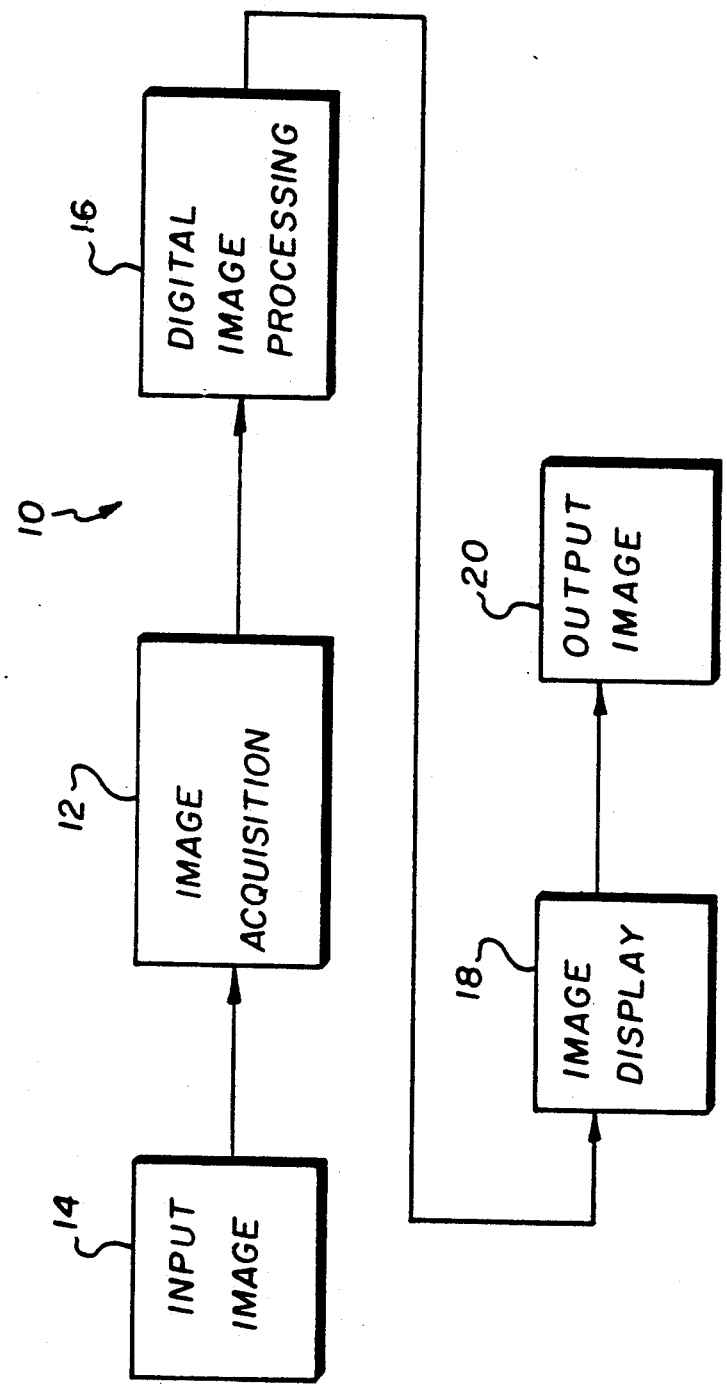
FIG. 1a is a block diagram of an imaging system in which the method of the present invention can be practiced.
Figure 1B:
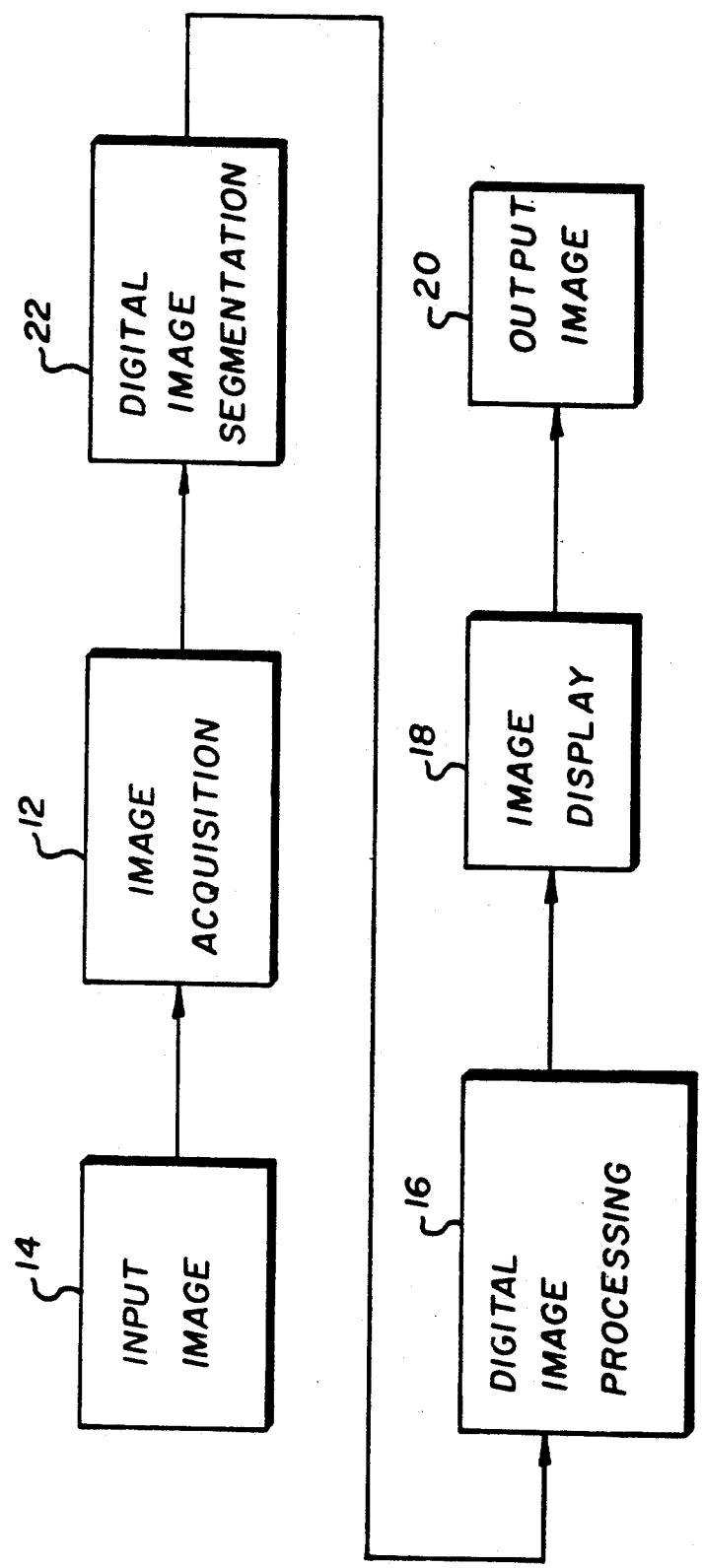
FIG. 1b is a block diagram of an imaging system with the method of the present invention in place.

FIG. 1a illustrates a typical system 10 in which the present invention could be practiced. The system consists of an image acquisition section (scanner) 12 in which the digital radiographic image signals 14 are obtained, a digital image signal processing section 16 in which the digital image signal data are manipulated with image processing algorithms intended to improve the appearance, diagnostic utility, and other properties of the image, and an image display section 18 in which the final processed output image signal 20 is made viewable. The method of the present invention would be inserted as a digital image segmentation section 22 into this imaging chain between the acquisition section 12 and the image processing section 16, as shown in FIG. 1b. The actual implementation of the present invention does not need to be separated from these two sections. It could, of course, reside directly in the acquisition section 12 or in the image processing section 16. In this way, the separation or segmentation of the image signal 14 into relevant and irrelevant or desired and undesired regions will occur before any other image processing takes place.

The digital radiographic image signals to be processed with this invention can be acquired in a variety of different systems, for example, from storage phosphor (computed radiography) systems, film digitizer systems, image intensifier systems, etc. In addition, one can use images acquired on computed tomography (CT) and magnetic resonance imaging (MRI) systems. For display devices, the most common are film writers (either laser printers or cathode ray tube (CRT) printers) and CRT soft displays.

Figure 1C:
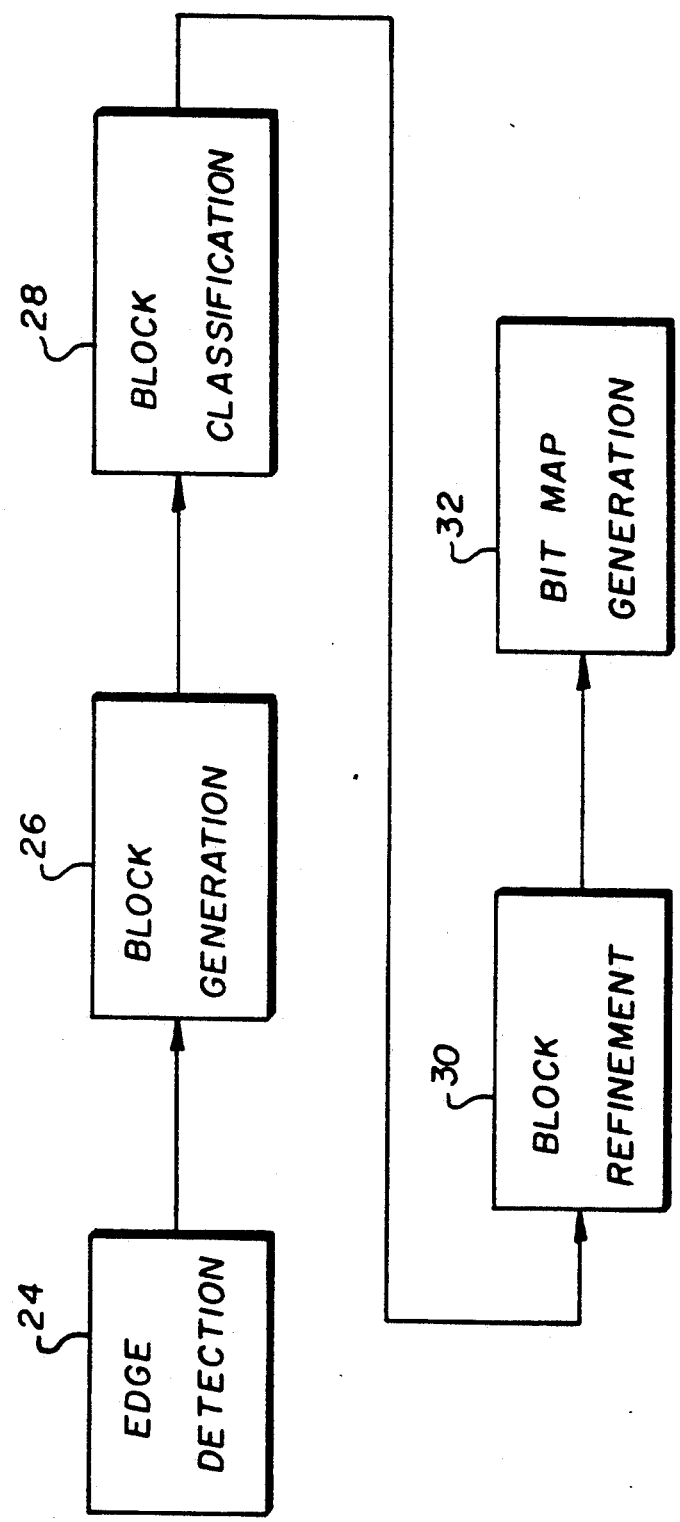
FIG. 1c is a block diagram of the method of the present invention.
Figure 2B:
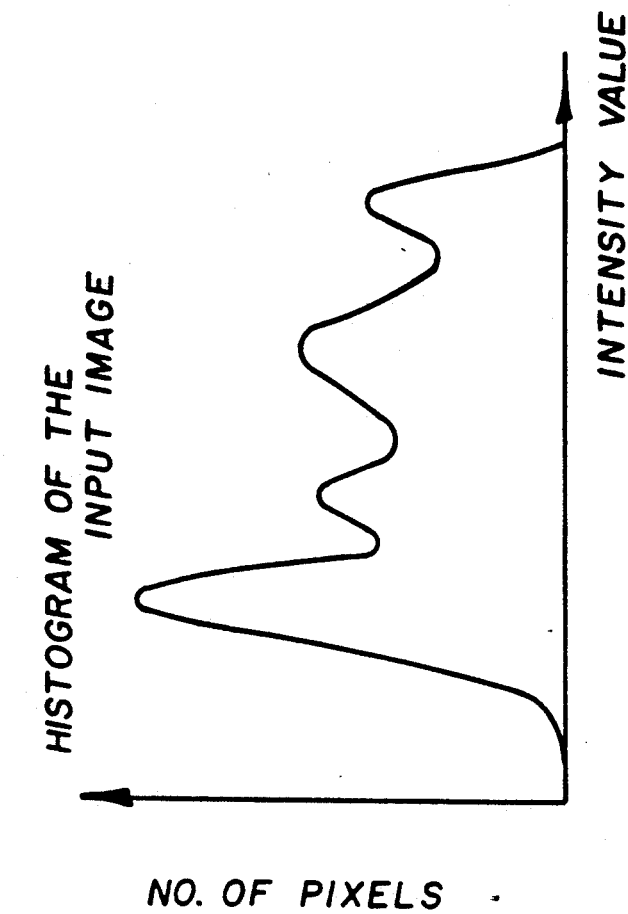
Figure 2A:
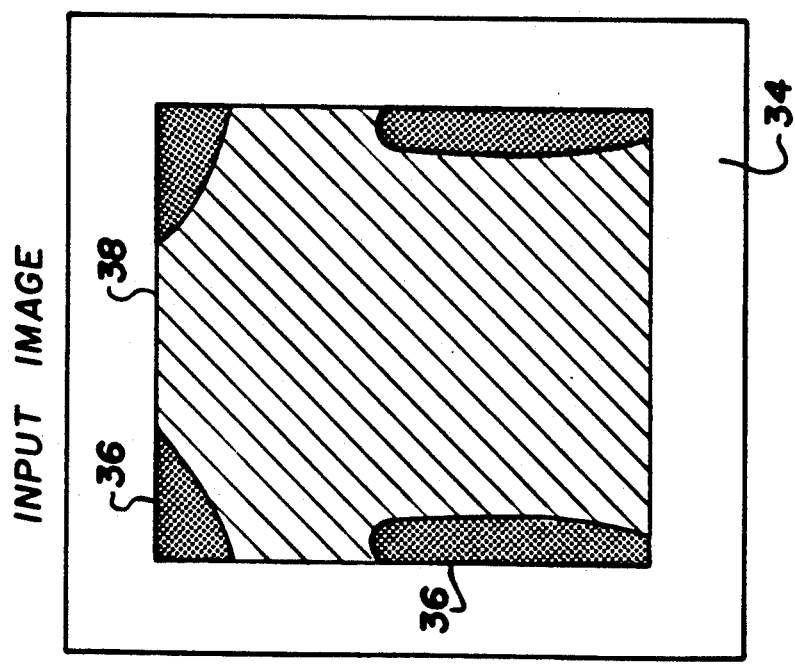
FIG. 2a is a diagrammatic view of a chest image containing foreground, background and object regions.
Figure 3B:
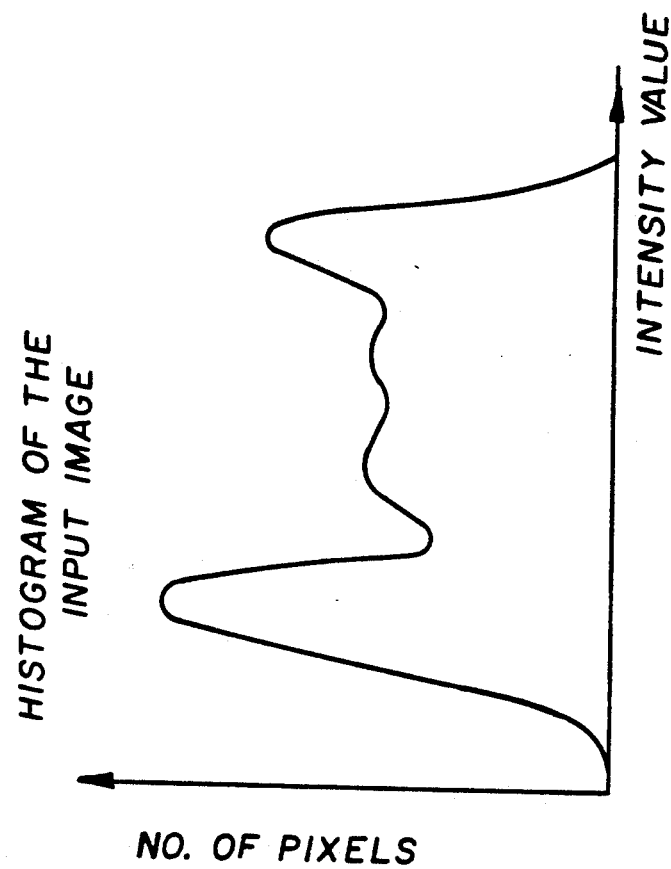
Figure 3A:
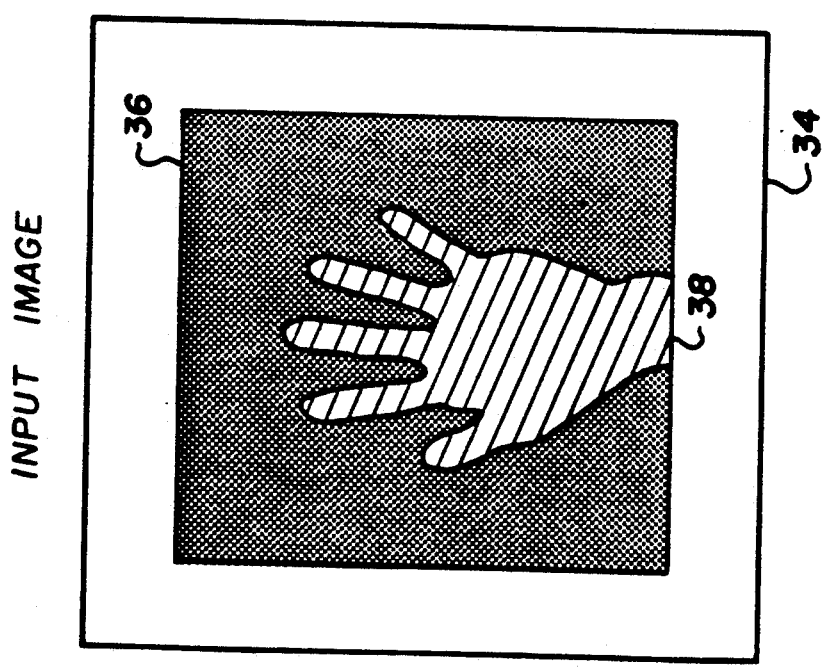
FIG. 3a is a diagrammatic view of a hand image containing foreground, background and object regions.

In general, as shown in FIG. 1c, the digital image segmentation method of the present invention includes the following steps, edge detection 24, block generation 26, block classification 28, block refinement 30 and bit map generation 32. For purposes of illustration, the operation of the present invention will be described with reference to a digital chest image signal, as shown in FIG. 2a. FIG. 2a shows a chest image signal containing foreground 34, background 36, and object regions 38 as defined in the present invention. The object region 38, in this case is the region inside the body part being imaged, that is, the region bounded on the left and right of the object by the skin line, and on the top and bottom of the object by the edge of a beam limiting device (collimator). The histogram of this digital image signal is shown in FIG. 2b as a graphical representation of the number of pixels at each pixel intensity value.

The first step in the method of the present invention is to detect and characterize the edges in the image signal, and, in particular, to find the density of edges in various parts of the image signal. In order to determine the edge density, an edge detection step is used. A variety of edge detection algorithms are known in the literature (see, for example, A. Rosenfeld, A. C. Kak, *Digital Picture Processing*, Academic Press, 1982), many of which may be suitable for use as edge detectors in the present invention. In the preferred embodiment of this invention, a morphological edge detector has been chosen because of its low sensitivity to noise, and its ability to yield an edge strength measure that is proportional to the contrast between the foreground/background and the object and is independent of the edge position and orientation. A brief discussion of morphological techniques is given in Appendix A.

It is preferable to operate the edge detection step on a smoothed version of the input image signal, rather than the original image signal. This is because the edge detection step can be sensitive to noise and may therefore create edge pixels in regions of the image where there really are no edges. In order to create the smoothed version of the input image, a spatial filtering operation is used. For example, a local average of the eight nearest neighbors could be used to produce the smoothed image signal, although other methods are available. The expression for the edge signal produced with the morphological edge detector of the preferred embodiment of this invention is given by:

$$g(x,y) = min[\hat{f} \circ B - \hat{f} \ominus B, \hat{f} \oplus B - \hat{f} \cdot B](x,y) \quad (1)$$

where $f$ is the smoothed input image, and B is the structuring element of the morphological operation.

The size and shape of the structuring element must be matched to the size of the image and the structures the edge detector is intended to find. Smaller structuring elements are capable of locating smaller features and are more computationally efficient than larger structuring elements, which are sensitive to coarser structures in the image. Thus, if the desired structures are reasonably large (i.e., containing relatively many pixels) in the smoothed input image signal, $\hat{f}$, it is often easier and more efficient to scale down the input image signal by decimation (subsampling) or averaging than to scale up the structuring element to match the size of the details of interest. Furthermore, if the structuring element can be made separable, that is, the two-dimensional structure B(x,y) can be represented as a product of two one-dimensional windows, then the computational effort of the edge detection stage can be reduced considerably, and the one-dimensional images produced by the separable structuring element, denoted by $g_x$ and $g_y$, can be recombined into a single edge signal image, for example, by quadrature:

$$g(x,y) = \sqrt{g_x^2(x,y) + g_y^2(x,y)} \quad (2)$$

The output of the edge detection step is an edge strength map signal, g(x,y), containing high-amplitude pixels in areas of edges and low-amplitude pixels in areas of weak or no edge. This map image signal must be thresholded in order to include only the most significant edges needed to distinguish object and foreground/background regions in the image signal. The choice of this (global) threshold can depend on factors like the exam type, the typical noise content of the input modality, and the amount of smoothing used in the preprocessing stage. Pixels in the edge strength image, g(x,y), with values greater than the threshold $T_e$ are considered to be edge pixels. The remaining pixels are considered to be non-edge pixels. In other words, a binary edge image, E(x,y), is produced from the edge strength map by thresholding:

$$E(x,y) = \begin{cases} 1, & \text{for } g(x,y) \geq T_e \\ 0, & \text{for } g(x,y) < T_e \end{cases} \quad (3)$$

Figure 4B:
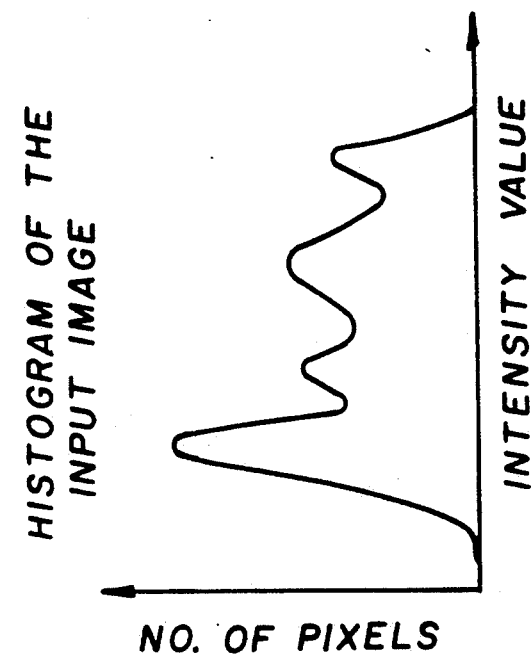
FIGS. 4a-g show the steps of the method of the present invention applied to the chest image of FIG. 2A.
Figure 4A:
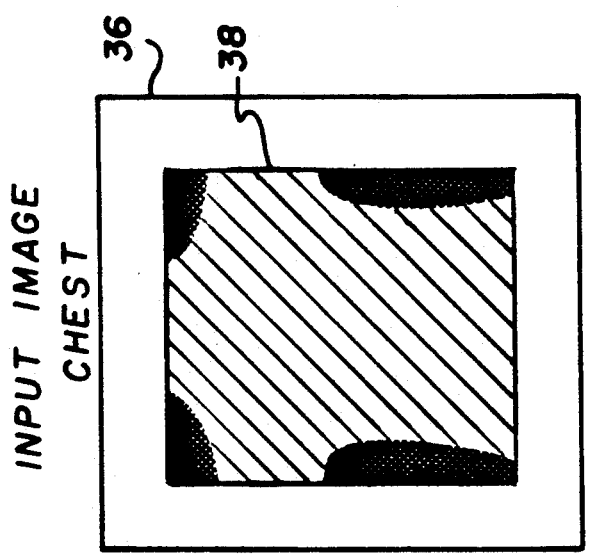
Figure 4E:
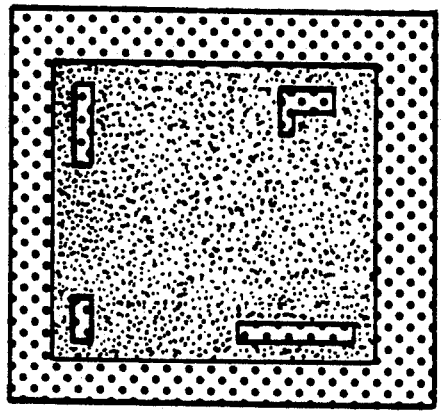
Figure 4D:
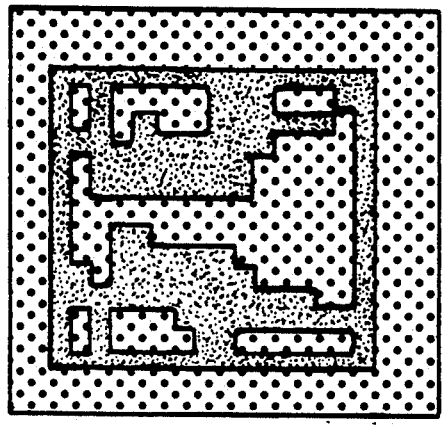
Figure 4C:
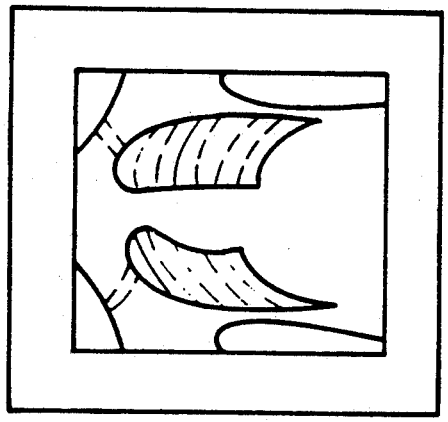

This is shown in FIG. 4c.

In order to make the thresholding step more robust, the edge strength map, g(x,y) can be compared to several thresholds calculated in different ways. For example, the threshold can be considered to be proportional to the maximum value of g(x,y):

$$T_e = \alpha_1 \cdot max[g(x,y)] \quad (4)$$

In this way, the threshold is adjusted to match the actual dynamic range of the edge signals. The proportionality constant, $\alpha_1$, must be determined experimentally for a variety of exam types. Alternatively, a threshold can be found by requiring that some fixed proportion, $\alpha_2$, of the detected edge pixels be retained in the edge strength image. Here again, the proportionality constant, $\alpha_2$, is empirically determined based on characteristics of the image class. Other methods of threshold selection are also possible. In the preferred embodiment of the present invention, the method is to automatically choose a threshold that maximizes the sum of the gradient values, g(x,y), taken over all pixels with a value equal to the threshold:

$$\max_{T_e} \left[ \sum_{g(x,y) = T_e} g(x,y) \right] \quad (5)$$

Since this method essentially involves the product of a threshold value and the number of pixels at that value, it is especially useful in cases when there are strong edges involving many pixels, as in the case of collimator blade edges delimiting an irradiation field.

The next step of the preferred method of the invention is to divide the image signal into a set of nonoverlapping, contiguous blocks of pixels for further analysis. The size of the pixel blocks depends on the size of the image. The blocks should be large enough to be able to calculate local statistical properties (e.g., mean and standard deviation), but small enough to resolve the structures necessary for accurately segmenting the foreground and background. By experimentation, the inventors have found that block dimensions on the order of 1/20th of the linear dimension of the input digital image are ideal for this division, but block sizes from 1/10th to 1/30th of the linear dimension of the input image all give similar results.

Once the image has been divided into pixel blocks, the next step according to the invention is the characterization or classification of each block. Each block can have ten possible states, depending on its degree of homogeneity and what it contains. The ten possible states of each block are:

(a) homogeneous background
(b) homogeneous foreground
(c) homogeneous object
(d) nonhomogeneous background
(e) nonhomogeneous foreground
(f) nonhomogeneous object
(g) mixed: background + foreground
(h) mixed: background + object
(i) mixed: foreground + object
(j) mixed: background + foreground + object The precise definitions of homogeneous and nonhomogeneous will be given below. A feature of the present invention in the context of the above list is to find all of the blocks in the image containing object pixels and to separate them from the blocks containing only foreground/background pixels. The blocks that exhibit mixed characteristics, i.e., that contain object pixels mixed with foreground and/or background pixels, are further classified in a refinement stage that extracts only the object region of each block.

Once the thresholded edge strength map, E(x,y) has been found according to Eq. (3), and the image signal divided into a set of pixel blocks, the next step is to classify the blocks. The first classification is into homogeneous and nonhomogeneous blocks. A block is defined as homogeneous if it has no or very few edge pixels, and has a low variance. Any block that does not meet these two criteria is considered nonhomogeneous.

The edge density, $m_d$, for a block can be defined as the ratio of the number of edge pixels in a block (after thresholding) to the total number of pixels in the block. If the image size is $N_x$ pixels/line and $N_y$ lines, and the block size is $S_x$ by $S_y$, then the edge density for BLOCK(p,q) is given by:

$$m_d = \frac{\text{\# of edge pixels in BLOCK}(p,q)}{S_x \cdot S_y} \quad (6)$$

where $$1 \leq p \leq P = \left[\frac{N_x}{S_x}\right] \text{ and } 1 \leq q \leq Q = \left[\frac{N_y}{S_y}\right] \quad (7)$$

The variance of BLOCK(p,q) can be calculated by standard statistical methods as:

$$\sigma^2 = \frac{1}{S_x \cdot S_y} \sum_{\lambda=1}^{r} h(\lambda)(\lambda - \mu)^2, \quad (8)$$

where l and r are the left-most and right-most nonzero gray levels in the local histogram h of BLOCK(p,q) and $\mu$ is the mean gray level of the block.

In the preferred embodiment of this invention, each block is subjected to the aforesaid two tests for edge density and variance. These tests involve a threshold comparison for each block. The edge density threshold for each block, $T_d$, can, for example, be chosen as some fixed fraction of the edge density of the entire image, that is, $$T_d = \beta \frac{\text{\# of edge pixels in } E(x,y)}{N_x \cdot N_y}, \quad (9)$$

where $\beta$ is the fixed fraction, which can be determined empirically. Similarly, the threshold for the variance, $T_v$, can be determined by experiments.

Using the combined results of these two tests, it is possible to make an initial classification of each block in the image. Specifically, one can create a binary block map H[p,q] that classifies each block as homogeneous (H=0) or nonhomogeneous (H=1):

$$H[p,q] = \begin{cases} 1, & m_d > T_d \text{ and } \rho^2 > T_v \\ 0, & \text{otherwise} \end{cases} \quad (10)$$

This is shown in FIG. 4d. The blocks that have been classified as homogeneous can be homogeneous foreground or background as well as homogeneous object regions (e.g., the subdiaphragmatic region in a chest image can sometimes be homogeneous). Further tests will be required to distinguish the homogeneous object regions from the homogeneous foreground/background regions. In addition, the blocks classified as nonhomogeneous can consist of nonhomogeneous foreground, background, and/or object, as well as combinations of the three. In order to further classify these regions two other steps of analysis, syntactic reasoning and refinement, are used.

The methods proposed in the prior art described above generally use low-level image processing techniques similar to those described so far for the present invention, e.g., the detection of edges, the characteristics of local or global histograms, and global thresholding. In order to provide a more accurate segmentation of the various regions in a digital radiograph, and thereby provide images of higher diagnostic utility, it is preferable that higher level image processing techniques be used to refine and modify the results obtained with the lower level techniques. In the current embodiment of the present invention, a high-level processing technique called syntactic reasoning (see K. S. Fu, Syntactic Pattern Recognition, Academic Press, New York, 1974) is first used to analyze and improve the results of the low-level stage.

In syntactic pattern recognition, a set of rules (grammar) is used to define the relationships between the various anatomical structures in different classes of images. The inventors have found by experimenting with a variety of exam types and input modalities that the rules disclosed below give an accurate and efficient segmentation of a large variety of digital radiographic images.

A number of notations are introduced here to abbreviate the descriptions of the following rules. For every nonhomogeneous (homogeneous) block $H[p,q]=1$ (0), let $C_{pq}$ be the connected component consisting of all nonhomogeneous (homogeneous) blocks connecting to $H[p,q]$. The number of blocks contained in $C_{pq}$ is defined as the size of $C_{pq}$ and denoted by $SIZE(C_{pq})$. The total number of blocks in the image is given by $PQ=P\times Q$, where P and Q have been defined in Eq. (7). The distance between two connected components $C_{pq}$ and $C_{p'q'}$ is denoted by $DIST(C_{pq}, C_{p'q'})$. Finally, the average gray level of the block $[p,q]$, denoted as $\mu[p,q]$, is given by $$\mu[p,q] = \frac{1}{S_x \cdot S_y} \sum_{(x,y)\in block[p,q]} f(x,y). \quad (11)$$

Finally, the output of syntactic reasoning is represented by the binary block map $S[p,q]$, which has the value of 0 if the block $[p,q]$ belongs to nonobject regions and the value of 1 if otherwise.

Rule 1: IF $[H[p,q]=1]$ and $[SIZE(C_{pq})\leq\gamma_1\cdot PQ]$ and $DIST(C_{pq}, \text{The image boundary})<\gamma_2\cdot PQ]$, THEN $S[p,q]=0$.

This rule is designed to detect isolated nonhomogeneous foreground/background regions, which may be caused by, for example, noise, nonuniform illumination, and labels (e.g., patient identification) attached to the image. The parameters $\gamma_1$ and $\gamma_2$, depend on the exam type and can be determined empirically.

Rule 2: IF $[H[p,q]$ and $[\text{Rule 1 is not true}]$, THEN $S[p,q]=1$.

This rule is designed to detect nonhomogeneous object regions.

Rule 3: IF $[H[p,q]=0]$ and $\{[(SIZE(C_{pq})\geq\gamma_3\cdot PQ)$ and $(DIST(C_{pq}, \text{The image boundary})\geq\gamma_4\cdot PQ)]$ or $[T_F\leq\mu[p,q]\leq T_B]\}$, THEN $S[p,q]=1$.

This rule is designed to detect isolated homogeneous object regions (e.g. the subdiaphragmatic region in a chest image can sometimes be homogeneous. The parameters $\gamma_3$ and $\gamma_4$, depend on the exam type and can be determined empirically. The determination of the thresholds $T_F$ and $T_B$ will be described below.

Rule 4: IF $[H[p,q]=0]$ and $[\text{Rule 3 is not true}]$, THEN $S[p,q]=0$.

This rule is designed to detect homogeneous foreground/background regions.

The resulting image $S[p,q]$ is shown in FIG. 4e.

The computation of the foreground and background thresholds, $T_F$ and $T_B$, is done as follows. First, a histogram of the gray-level values of only the edge pixels is computed (the edge pixels are the pixels equal to 1 in the image $E(x,y)$). The minimum and maximum values of this histogram, $\lambda_{min}$ and $\lambda_{max}$, are used to calculate the thresholds:

$$F_F=\lambda_{min}+\gamma_5(\lambda_{max}-\lambda_{min}) \quad (12)$$

$$T_B=\lambda_{max}-\gamma_5(\lambda_{max}-\lambda_{min}) \quad (13)$$

where $\gamma_5$ is a parameter determined experimentally from a large variety of clinical images.

At this point the majority of the blocks in the resulting image $S[p,q]$ have been classified as object (i.e., $S[p,q]=1$) or nonobject (i.e., foreground/background, $S[p,q]=0$). However, some blocks containing the boundary of the object may still consist of a mixture of object and foreground or background. In order to assign the appropriate thresholds for these blocks, a refinement step is used to analyze them further. Let the output refined image be denoted by $F(x,y)$ with the value 1 indicating the body part and 0 the foreground/background. The refinement process is an adaptive thresholding process that iteratively removes from each boundary block $\partial S[p,q]$ those pixels with gray levels greater than a threshold $T_H(p,q)$ (i.e., background) or less than a threshold $T_L(p,q)$ (i.e., foreground). This can be formulated as a rule:

Rule 5: IF $[((x,y)\ominus\partial S[p,q])$ and $(T_L(p,q)\leq f(x,y)\leq T_H(p,q))]$ or $[(x,y)\notin\partial S[p,q]]$, THEN $F(x,y)=1$.

Rule 6: IF $[\text{Rule 5 is not true}]$, THEN $F(x,y)=0$.

Figure 4G:
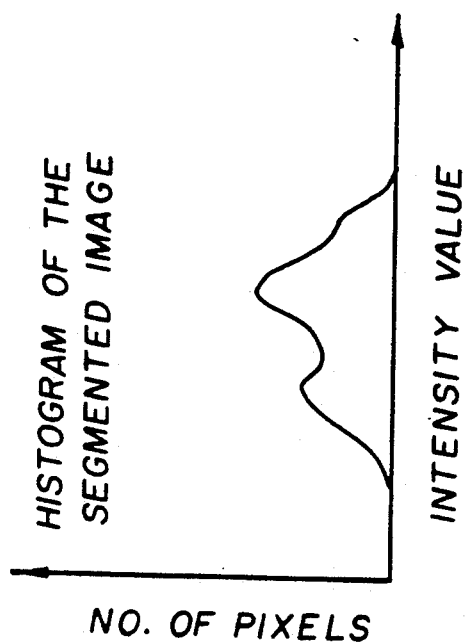
Figure 4F:
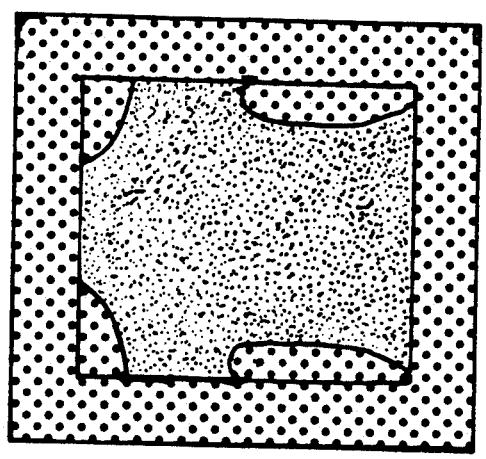
Figure 5B:
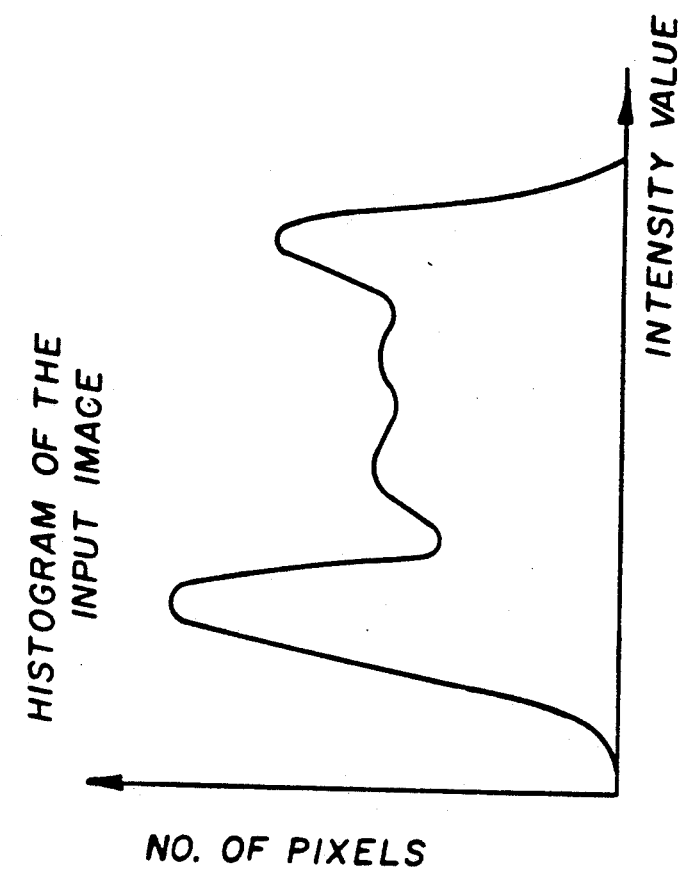
Figure 5A:
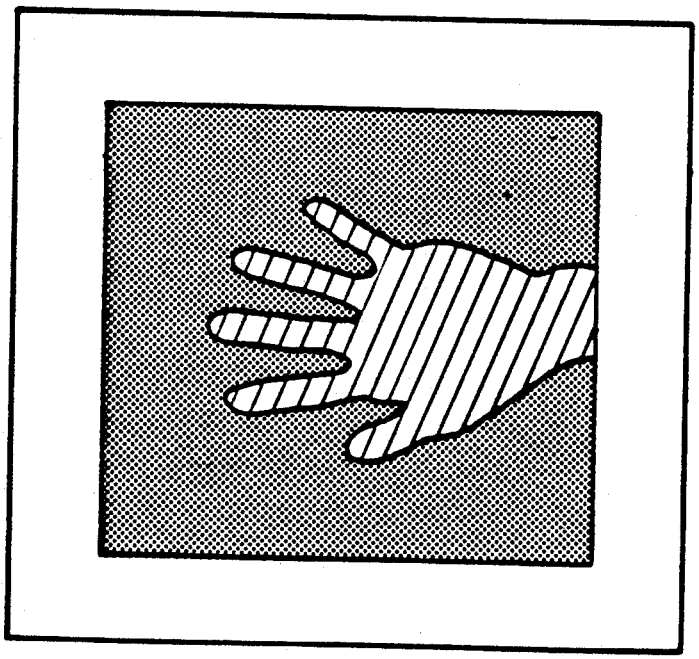

Consequently, the bit map (binary image) $F(x,y)$ is created, and this segmentation result is used as a template for any further image processing to be done on the image. This is shown in FIG. 4f. The histogram of the gray level data from the segmented image (the body part) is shown in FIG. 4g.

The determination of the thresholds $T_L(p,q)$ and $T_H(p,q)$ for each block of interest can be done, for example, by looking at the properties of neighboring blocks. If $\mu_f(p,q)$, $\sigma_f(p,q)$, denote the mean and standard deviation of the blocks identified as foreground among the eight neighboring blocks around a block of interest, and $\mu_b(p,q)$, and $\sigma_b(p,q)$ denote the mean and standard deviation of the blocks identified as background among the eight neighboring blocks around the same block, then the thresholds are computed by:

$$T_L(p,q)=\mu_f(p,q)+\delta\sigma_f(p,q) \quad (14)$$

$$T_H(p,q)=\mu_b(p,q)-\delta\sigma_b(p,q) \quad (15)$$

Figure 6A:
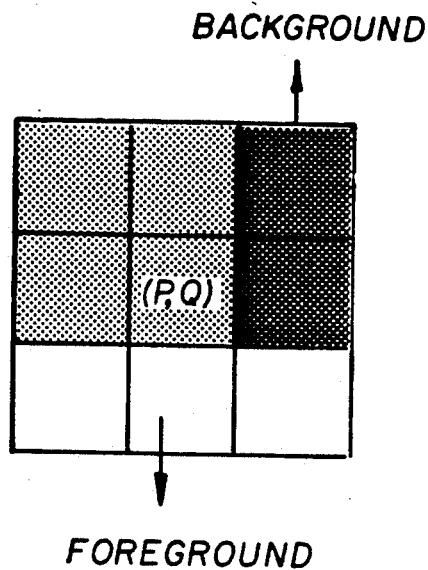
FIG. 6a is a schematic diagram showing the process of refining the nonhomogeneous (mixed) boundary blocks according to the method of the present invention.
Figure 6B:
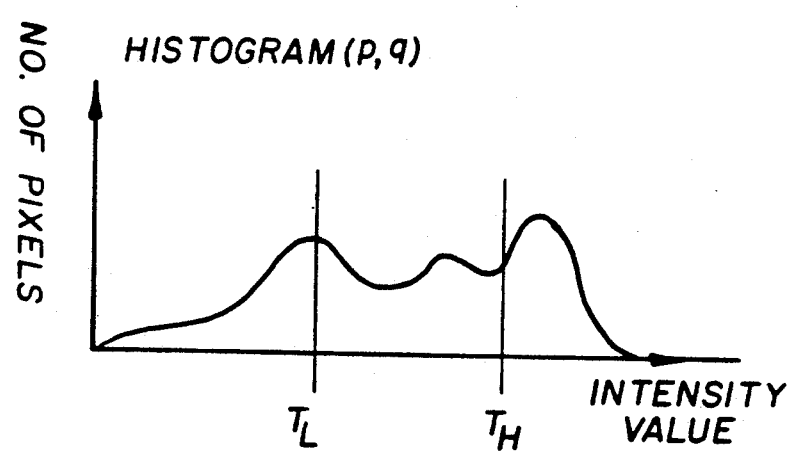
FIG. 6b shows the histogram of the 8 neighboring blocks around the block [p,q] shown in FIG. 6a, used to compute the high and low threshold values.

The parameter $\delta$ can be determined empirically. If an object boundary block also happens to be on the boundary of the image, at least two neighboring blocks will be available to compute the thresholds. FIG. 6a shows a diagram for the process of refining the nonhomogeneous (mixed) boundary blocks. FIG. 6b shows the histogram of the block [p,q], as well as the high and low thresholds computed from the 8-neighboring blocks of the block [p,q]. Those pixels in the block [p,q] with gray levels greater than $T_L(p,q)$ and less than $T_H(p,q)$ are considered to be object pixels.

The results of extensive experimentation by the inventors on clinical images from a variety of sources have confirmed the ability of the present invention to determine accurately the foreground, background, and object regions in a digital radiograph. Examples of the various stages of the method applied to an extremity (hand) image are shown in FIG. 5a through 5g.

The parameters of the method, which need to be determined through experimentation are given in Table 1 for four different exam types, chest, extremity, skull, and abdomen. These were determined by using the method on images acquired from storage phosphor systems and scanned film systems. It has been observed by the inventors that the typical values for $\beta$, $T_v$, $\gamma_5$, and $\delta$ are 0.1, 8.5, 0.25, and 1.0, respectively. The other parameters that are employed in the syntactic reasoning depend on the exam type. In the case of the storage phosphor images, the original images were acquired at a resolution of 2048 pixels/line and 2500 lines and 12 bits/pixel. In order to make the foreground/background finding method of the present invention more efficient, the image was subsampled by a factor of 9 in both directions, resulting in an image 227 pixels by 277 pixels in size. The block size was selected to be 10 pixels by 10 pixels, which is about the order of 1/20th of the linear dimension of the subsampled image. A 3'3 structuring element, which can be represented as a product of two one-dimensional windows (i.e., $3 \times 1$ and $1 \times 3$ windows), was used in the aforementioned morphological edge detector. The method was applied to this image using a SUN 4/110 workstation with the algorithm implemented in software. The output of the method was a 1-bit image with 0 indicating the foreground/background regions and 1 indicating the object regions. This result was achieved in approximately 10 seconds. Hardware implementation is obviously also possible, with a significant reduction of processing time.

The image size of the subsampled image chosen for the preferred embodiment of the present invention was based on a series of tests with image sizes ranging from full resolution ($2048 \times 2500$) to $64 \times 78$. There was very little influence on the quality of the result with image size until the smallest sizes were reached (subsampling factors greater than approximately 16). Thus, efficient operation can be achieved even though the present invention involves higher level syntactic analysis in order to do the segmentation accurately.

TABLE 1

|  | Chest | Extremity | Skull | Abdomen |
|---|---|---|---|---|
| $\beta$ | 0.1 | 0.1 | 0.1 | 0.1 |
| $T_v$ | 8.5 | 8.5 | 8.5 | 8.5 |
| $\gamma_1$ | 0.50 | 0.15 | 0.15 | 0.50 |
| $\gamma_2$ | 0.005 | 0.010 | 0.015 | 0.005 |
| $\gamma_3$ | 0.1 | 0.25 | 0.25 | 0.1 |
| $\gamma_4$ | 0.005 | 0.03 | 0.03 | 0.015 |
| $\gamma_5$ | 0.25 | 0.25 | 0.25 | 0.25 |

TABLE 1-continued

|  | Chest | Extremity | Skull | Abdomen |
|---|---|---|---|---|
| $\delta$ | 1.0 | 1.0 | 1.0 | 1.0 |

Another mode of the present invention is to detect a plurality of irradiation subregions on a single image. This is shown in FIG. 7a. The detection method consists of edge detection, block generation, block classification, region growing, and bit map generation. In the preferred embodiment of this invention, a morphological edge detector as described in the aforementioned foreground/background detection method is used. This is shown in FIG. 7b. An image is then divided into a set of nonoverlapping, contiguous blocks, and each block is classified as homogeneous or nonhomogeneous according to Eq. (10). The resulting image, denoted by H, is shown in FIG. 7c. To confine the following region-growing process, the complement of H, denoted by $H^c$, is created. This is shown in FIG. 7d.

Figure 7H:
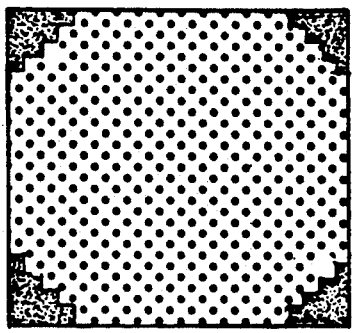
Figure 7G:
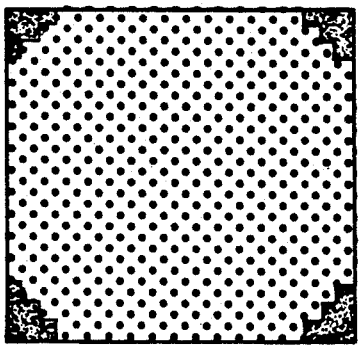
Figure 7F:
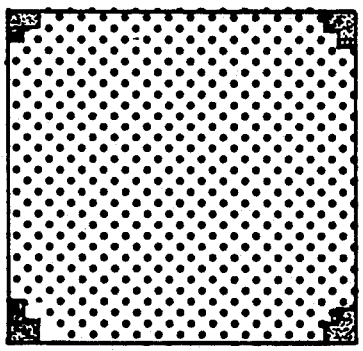
Figure 7E:
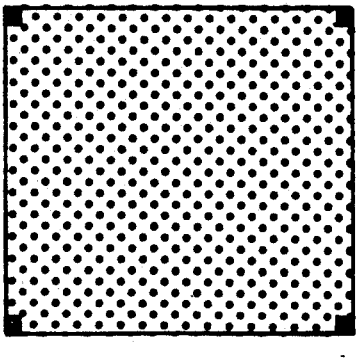

The region-growing stage is an iterative process which begins by setting the homogeneous corner blocks as the initial seeds. This is shown in FIG. 7e. In each iteration, the seeds are expanded to their 4-neighbors (i.e., the right, left, top, and bottom blocks), and the intermediate result is intersected with $H^c$, yielding a new set of seeds to be grown in the next iteration. The process repeats until there is no change in any two successive iterations. FIGS. 7f through 7k show the seeds after 2, 3, 4, 5, 10, and 15 iterations, respectively. The converged result is shown in FIG. 7l where the seeds image does not change even if the iteration continues.

Thus, a bit map of a plurality of irradiation subregions can be obtained by complementing the converged seeds image, which is shown in FIG. 7m. The aforementioned foreground/background detection method can then be applied to each subregion of the image, leading to images with high quality and high diagnostic utility in each subregion.

APPENDIX A

Mathematical morphology is a set-theoretic method for image analysis. Its objective is to provide a quantitative description of the geometric structure of an image. The general approach is to probe and transform an image with different patterns called structuring elements.

The basic operations are erosion and dilation. Erosion can be viewed geometrically as a transformation that shrinks a set. For a binary image signal X, an erosion by a structuring element B is defined as the intersection of all translations of X by the points $b \in B$, that is, $$X \ominus B = \bigcap_{b \in B} (X)_b.$$

The dual operation of erosion is dilation, which is defined as the union of all translations of X by b, that is, $$X \oplus B = \bigcup_{b \in B} (X)_b$$

and can be viewed geometrically as a transformation that expands a set X. When a signal is eroded and then dilated, this operation is called an opening and is denoted by $$XOB = (X \ominus B) \oplus B.$$

Similarly, closing, denoted as $$X \cdot B = (X \oplus B) \ominus B$$

is defined by first dilating the signal and then eroding the output signal. The binary morphological operations of dilation, erosion, opening, and closing are all naturally extended to gray-level images by the use of minimum or maximum operation. The definition of erosion, dilation, opening and closing of a gray-level signal f by a binary structuring element B are listed as follows:

$$f \ominus B = \min_{y \in B}[f(x+y) - B(y)],$$

$$f \oplus B = \max_{y \in B}[f(x-y) + B(y)],$$

$$fOB = (f \ominus B) \oplus B,$$

$$f \cdot B = (f \oplus B) \ominus B.$$

See Haralicok et al., IEEE Trans. Pattern Analysis and Machine Intelligence, vol. 9, p. 532, 1987, for more details and references.

What we claim is:

1. A method for automatically segmenting desired regions in a digital radiographic image signal from undesired regions, comprising the steps of:
   providing a digital radiographic image signal including a foreground region, a background region, and an object region;
   detecting edges in the image signal based on a morphological edge detector;
   decomposing said image signal into a set of nonoverlapping, contiguous blocks of pixel signals;
   classifying a block of pixel signals to be homogeneous or nonhomogeneous as a function of its edge density and variance;
   applying a set of syntactic rules to detect the nonhomogeneous blocks of pixel signals in the foreground/background, as well as the homogeneous blocks of pixel signals in the object;
   refining the blocks consisting of a mixture of object and foreground/background; and
   producing a segmented image signal.

2. The method of claim 1 wherein the shape and size of a pixel block can be adjusted according to the size of said image signal.

3. The method of claim 1 wherein said refining step refines a pixel block consisting of a mixture of object and foreground/background pixels, based on its local statistics.

4. The method of claim 1 wherein said set of syntactic rules includes one or more of the following rules:
   (a) a rule or rules to detect the foreground/background regions which are nonhomogeneous;
   (b) a rule or rules to detect object regions which are nonhomogeneous;
   (c) a rule or rules to detect the object regions which are homogeneous;
   (d) a rule or rules to detect the foreground/background regions which are homogeneous.

5. The method of claim 1 wherein in said applying syntactic rules step a set of clinically and empirically determined decision rules is used to relate various structures of said image signal, and then to detect the nonhomogeneous blocks of pixel signals in the foreground/background, as well as the homogeneous blocks of pixel signals in the object.

6. The method of claim 1 wherein the pixel block classifying step is done by classifying each pixel block into one of ten possible states, depending on its degree of homogeneity and what it contains.

7. The method of claim 6 wherein said ten possible classification states are:
   (a) homogeneous background;
   (b) homogeneous foreground;
   (c) homogeneous object;
   (d) nonhomogeneous background;
   (e) nonhomogeneous foreground;
   (f) nonhomogeneous object;
   (g) mixed: background + foreground;
   (h) mixed: background + object;
   (i) mixed: foreground + object;
   (j) mixed: background + foreground + object.

8. The method of claim 1, including the step of smoothing said digital radiographic image signal before said edge detecting step.

9. The method of claim 8 wherein said smoothing step is effected by a spatial filtering operation.

10. The method of claim 9 wherein said spatial filtering operation includes averaging each pixel of said digital image with the eight nearest neighboring pixels thereof.

11. The method of claim 1 wherein said morphological edge detector produces an edge strength signal, $g(x,y)$, having the following formula:

$$g(x,y) = \min[\hat{f}B - f\theta B, \hat{f} \oplus B - \hat{f} \cdot B](x,y)$$

where $\hat{f}$ is the smoothed said image signal and B is used to interact with said image signal and is a structuring element which is similar to a kernal in a convolution operation.

12. The method of claim 11 wherein said structuring element of the morphological edge detector can be decomposed into a number of smaller pixel subsets to improve the implementation efficiency.

13. The method of claim 11 wherein said edge strength signal has high-amplitude in areas of strong edges and low-amplitude in areas of weak or no edges.

14. The method of claim 1 wherein said detecting edges step identifies edges as those pixels where said edge strength signal has amplitudes exceeding an edge strength threshold value.

15. The method of claim 14 wherein said edge strength threshold value is automatically determined by maximizing the product of said edge strength threshold and the number of pixels at that threshold.

* * * * *